United States Patent
Hart (10) Patent No.: US 9,064,210 B1
(45) Date of Patent: Jun. 23, 2015

(54) SEMANTICALLY-AWARE BEHAVIORAL SECURITY ANALYSIS SYSTEM FOR SECURITY INFORMATION AND EVENT MANAGEMENT

(75) Inventor: Catherine V. Hart, Arlington, MA (US)

(73) Assignee: EMC Corporation, Hopkinton, MA (US)

( * ) Notice: Subject to any disclaimer, the term of this patent is extended or adjusted under 35 U.S.C. 154(b) by 585 days.

(21) Appl. No.: 13/436,884

(22) Filed: Mar. 31, 2012

(51) Int. Cl.
*G06F 15/18* (2006.01)
*G06N 7/00* (2006.01)
*G06F 21/00* (2013.01)

(52) U.S. Cl.
CPC ............... *G06N 7/005* (2013.01); *G06F 21/00* (2013.01)

(58) Field of Classification Search
None
See application file for complete search history.

(56) References Cited

U.S. PATENT DOCUMENTS

| 6,304,973 | B1* | 10/2001 | Williams | 726/3 |
| 2008/0010225 | A1* | 1/2008 | Gonsalves et al. | 706/11 |
| 2008/0104276 | A1* | 5/2008 | Lahoti et al. | 709/245 |
| 2009/0328215 | A1* | 12/2009 | Arzi et al. | 726/23 |

OTHER PUBLICATIONS

U.S. Appl. No. 12/982,288, filed in the name of J.P. Field et al. on Dec. 30, 2010 and entitled "Distributed Security Information and Event Management System with Application-Injected Remote Components."
"RSA enVision® Platform at a Glance," The Security Division of EMC, 3-in-1 Log Management Solution, Product Data Sheet, 2008-2009, 2 pages.
Gary Hardegree, "Philosophy 595—Formal Semantics," http://www-unix.oit.umass.edu/~gmhwww/595/text.htm, Mar. 30, 2012, 732 pages.

* cited by examiner

*Primary Examiner* — Ben Rifkin
(74) *Attorney, Agent, or Firm* — Ryan, Mason & Lewis, LLP (57) ABSTRACT

A behavioral security analysis system comprises a computational semantic parser configured to process data associated with a security information and event management (SIEM) system to generate a plurality of logical descriptors, and a learning engine coupled to the computational semantic parser and configured to generate a plurality of behavioral security descriptors based at least in part on at least a subset of the logical descriptors. The behavioral security descriptors are made accessible to an alerting engine of the SIEM system and utilized to generate one or more security alerts. The computational semantic parser may be operative, for example, to syntactically decompose a portion of the data into component elements, to assign lexical meanings and context denotation information to the component elements, and to apply semantic recomposition to generate a given logical descriptor based on a combinatorial tree having a structure determined using the assigned lexical meanings and context denotation information.

20 Claims, 4 Drawing Sheets

SEMANTICALLY-AWARE BEHAVIORAL SECURITY ANALYSIS SYSTEM FOR SECURITY INFORMATION AND EVENT MANAGEMENT

FIELD

The field relates generally to information processing systems, and more particularly to the provision of security information and event management (STEM) functionality for cloud infrastructure or other types of information technology infrastructure.

BACKGROUND

A typical conventional STEM system is fully centralized. The centralized SIEM system collects raw log information from monitored remote applications of an enterprise environment, and uses the collected raw log information to build a comprehensive database of application activity. The system subsequently performs correlations on the data stored in the database to determine, for example, if specified patterns are found.

This conventional centralized approach has a number of significant drawbacks. For example, collecting and indexing raw log information in a centralized location increases latency. Also, many of the desired correlations may not require the complete environment context, and so working in a single large centralized database slows the system performance, as much of the data collected and indexed is not relevant to a particular query. In addition, since there are usually many queries to be correlated, and these are sharing a single database, it is unduly complex to prioritize and otherwise schedule resources for a selected subset of queries that might affect a subset of users or services. These and other problems create serious scalability issues for centralized STEM systems, and as a result it is becoming increasingly difficult to implement such systems in large-scale public or private clouds or using other types of distributed virtual infrastructure.

Another important drawback of the centralized STEM approach is loss of application context. Since the log information is transmitted to a single collection point, relevant application context may be lost. For example, the log information may not contain all of the disk or memory program context that existed at the moment the log record was persisted. By its nature, a log record is a very specific, limited summary of something that the application chooses to record. It is not everything that is known to the application when the log was written. More information, such as current power consumption, or the identification of other processes running on the host, may be relevant, but will not be logged natively by the application, and therefore will not be accessible to the centralized STEM system.

These and other issues are addressed in U.S. patent application Ser. No. 12/982,288, filed Dec. 30, 2010 and entitled "Distributed Security Information and Event Management System with Application-Injected Remote Components," which is commonly assigned herewith and incorporated by reference herein. Embodiments disclosed therein provide a distributed SIEM system that comprises a centralized portion and a plurality of remote portions, with the remote portions being implemented in respective applications within information technology infrastructure. Each of the remote portions comprises one or more remote components inserted into the corresponding application. At least a subset of the remote components of the remote portion are configured for interaction with one or more corresponding centralized components of the centralized portion of the system.

In such an arrangement, remote components of the SIEM system may be injected directly into applications running on servers or other types of information technology infrastructure, which may comprise distributed virtual infrastructure. The distributed SIEM system is therefore more scalable, more responsive and more autonomic than the conventional centralized SIEM system. The distributed SIEM system can narrow the window between initial suspect activity, and the initial SOC response, while at the same time offloading some of the application-specific or routine correlation work from the centralized portion of the SIEM system. This allows the centralized portion of the SIEM system to monitor for activity at a higher level, correlating across a set of richer, application-context aware events.

Despite the advances provided by the above-described techniques, a need remains for further improvements in SIEM systems. For example, security analysts using such systems typically must perform manual security analysis each time a suspicious event occurs. For example, they will manually seek system-state data that looks out of the ordinary, and attempt to trace connections between events where appropriate. Accordingly, most of the actual understanding and process lies with the human agent interpreting the behaviors witnessed on a network.

SUMMARY

An illustrative embodiment of the present invention provides an information processing system that includes automated behavioral security analysis functionality. The functionality may be implemented at least in part within a centralized or distributed security information and event management (SIEM) system.

In one embodiment, a behavioral security analysis system comprises a computational semantic parser configured to process incoming log data or other data associated with a SIEM system to generate a plurality of logical descriptors, and a learning engine coupled to the computational semantic parser and configured to generate a plurality of behavioral security descriptors based at least in part on at least a subset of the logical descriptors. The behavioral security descriptors are made accessible to an alerting engine of the SIEM system and utilized to generate one or more security alerts.

The computational semantic parser may be operative, for example, to syntactically decompose a portion of the data into component elements, to assign lexical meanings and context denotation information to the component elements, and to apply semantic recomposition to generate a given logical descriptor based on a combinatorial tree having a structure determined using the assigned lexical meanings and context denotation information.

The illustrative embodiments advantageously overcome one or more of the above-noted drawbacks of conventional SIEM approaches. For example, the behavioral security analysis system implemented in or otherwise associated with the SIEM in one or more embodiments provides an automated layer of log parsing such that novel incoming messages can be used for downstream content functionality, such as reporting and correlation, without manual human intervention for classification and categorization. This also allows correlation, aggregation, and comparison in a flexible, generalized format, thus allowing the expression of malicious patterns as, for example, known-bad sequences of generalized logical semantic expressions, or deviations from a previously-assessed functional semantic baseline. Accordingly, the disclosed techniques provide a predictive SIEM platform having a greatly enhanced ability to detect security breaches and other security-related anomalies.

These and other features and advantages of the present invention will become more readily apparent from the accompanying drawings and the following detailed description.

DETAILED DESCRIPTION

Illustrative embodiments of the present invention will be described herein with reference to exemplary information processing systems and associated computers, servers, storage devices and other processing devices. It is to be appreciated, however, that the invention is not restricted to use with the particular illustrative system and device configurations shown. Accordingly, the term "information processing system" as used herein is intended to be broadly construed, so as to encompass, for example, processing systems comprising private or public cloud computing or storage systems, as well as other types of processing systems comprising physical or virtual processing resources in any combination.

Figure 1:
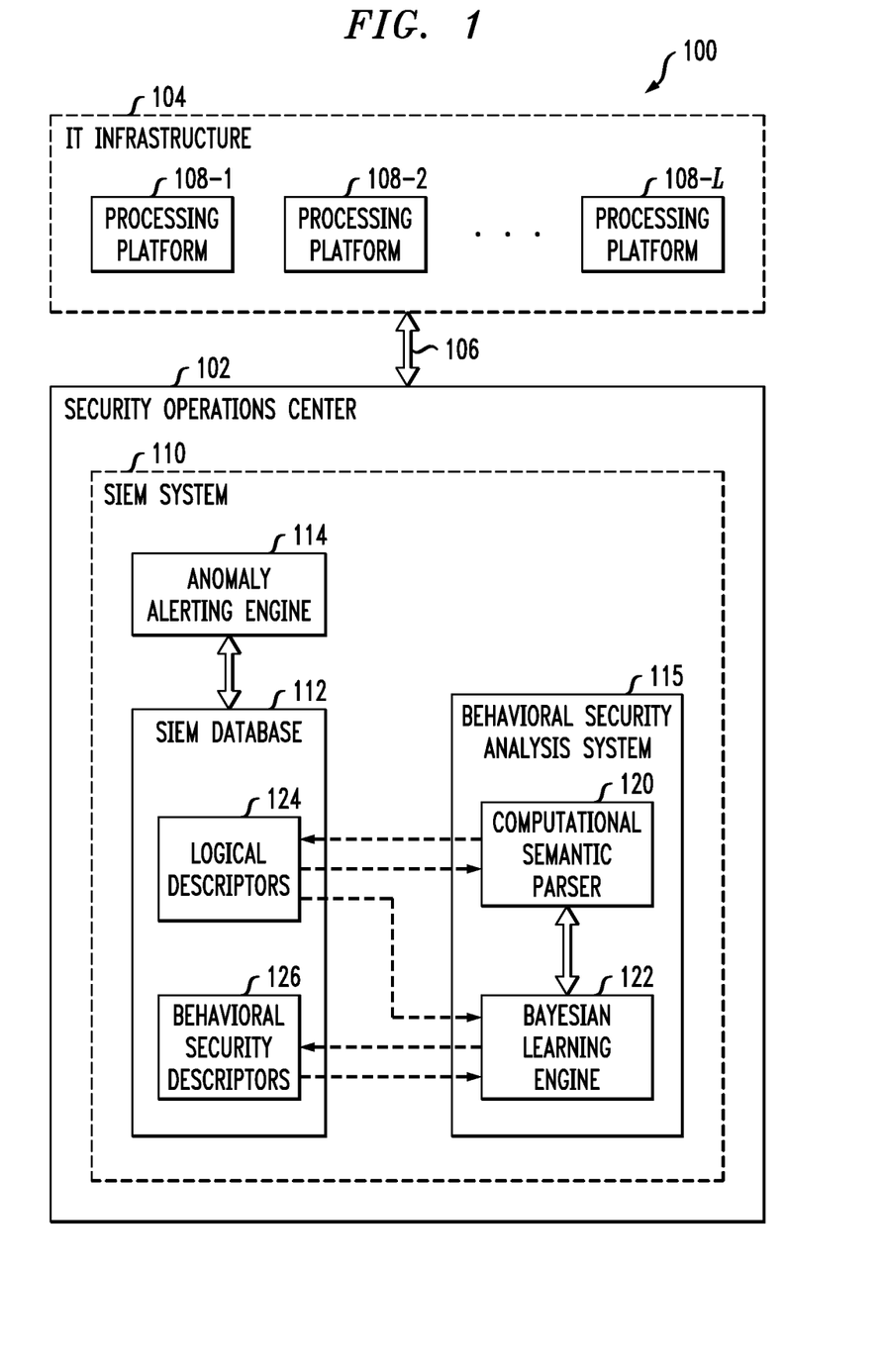
FIG. 1 shows an information processing system that incorporates security information and event management (SIEM) with semantically-aware behavioral security analysis functionality in an illustrative embodiment of the invention.

FIG. 1 shows an information processing system 100 configured in accordance with an illustrative embodiment of the invention. The system 100 in this embodiment comprises a security operations center (SOC) 102 coupled to information technology (IT) infrastructure 104 via one or more network connections 106. The SOC 102 generally provides monitoring and control functions for the IT infrastructure 104.

The IT infrastructure 104 comprises a plurality of processing platforms 108-1, 108-2, . . . 108-L, each of which may comprise a different set of one or more computers, servers, storage devices or other processing devices, in any combination. Examples of processing platforms that may form portions of the IT infrastructure 104 in system 100 will be described in more detail below in conjunction with FIGS. 3 and 4. Such processing platforms may comprise cloud infrastructure of a cloud service provider.

The system 100 farther comprises an SIEM system 110 that includes an SIEM database 112 and an anomaly alerting engine 114. Portions of the SIEM system 110 may correspond to elements of an otherwise conventional SIEM system, such as the enVision® platform commercially available from RSA, The Security Division of EMC Corporation of Hopkinton, Mass.

The SIEM system 110 in the present embodiment is configured to include a behavioral security analysis system 115. The behavioral security analysis system 115 comprises a computational semantic parser 120 configured to process data associated with the SIEM system 110 in order to generate a plurality of logical descriptors 124 that are stored in SIEM database 112. The behavioral security analysis system 115 further comprises a Bayesian learning engine 122 coupled to the computational semantic parser 120 and configured to generate a plurality of behavioral security descriptors 126 based at least in part on at least a subset of the logical descriptors 124.

The behavioral security descriptors 126 are also stored in the STEM database 112, and are made accessible to the anomaly alerting engine 114 of the SIEM system 110 and utilized to generate one or more security alerts within the system 100. For example, the alerting engine 114 may be configured to generate a given one of the security alerts upon detection of an event having particular characteristics associated with one or more of the behavioral security descriptors 126.

The SIEM database 112 comprises a data warehouse platform in which an optimized data model and ontology are employed for fast aggregation, search, and comparison of not only literal log data, but also logical representations of that data. The database 112 therefore serves not only as the basic data repository for the STEM functionality of system 110, but as the base locus of analytic and detection activity. An exemplary commercially-available product that may be utilized in database 112 is Greenplum Database, commercially available from Greenplum, a division of EMC Corporation.

Although shown as being implemented entirely within the SIEM system 110 in the present embodiment, portions of the behavioral security analysis system 115 in other embodiments may be implemented in other system elements.

As will be described in greater detail below, the computational semantic parser 120 in the present embodiment comprises a syntactic decomposition module configured to decompose a portion of the STEM data into component elements, a lexical meaning assignment module configured to assign lexical meanings to the component elements, a denotation assignment module configured to assign context denotation information to the component elements, and a semantic recomposition module configured to generate a given logical descriptor based on at least one combinatorial tree having nodes associated with respective ones of the component elements and a tree structure determined at least in part based on the assigned lexical meanings and context denotation information. Other types and arrangements of one or more processing modules may be used to implement the computational semantic parser 120 in other embodiments of the invention.

The Bayesian learning engine 122 is configured, for example, to assign Bayesian risk scores to respective ones of the behavioral security descriptors 126 based on one or more security threat models. Although implemented as a Bayesian learning engine in the present embodiment, other types of learning engines may be used in other embodiments.

The behavioral security analysis system 115 greatly enhances incident and event detection capabilities of SIEM system 110 by providing the basis for a behavioral conception of security data, and in effect an expert system for security analysis in near real-time. Behavioral security analysis as the term is used herein is intended to encompass the practice of understanding the exploitation of threats and exposures in terms of those specific actions taken by the malicious agent, be it human or software. For example, it may involve tracking behavior on a network over time, be it by users, network addresses, systems, netflows, or other collectible data. By observing the unfolding of events in time, patterns can be established that represent sets of actions organized by agent, whether malicious or benign. This involves the expression of meaning in a machine-interpretable, internally consistent, and fundamentally abstracted representational format.

The computational semantic parser 120 is configured to translate natural-language-like system logs into a second-order predicate logic target language, as well as handling the assignment variables and categorizations. One advantage of such an arrangement is that, by relying on an appropriate lexicon, this type of parsing can be performed without human intervention.

The Bayesian learning engine 122 is configured to analyze incoming events based upon pre-defined models of threats, correlated and quantified through the assignment of Bayesian risk scores. Over time, an unsupervised learning process can also be employed to process historical data and determine, on a per-attribute basis, what types of events constitute "normal" behavior, and detect and alert on those that are anomalous. The Bayesian learning engine may be implemented at least in part utilizing a commercially-available product such as the RSA Core Risk Engine.

The behavioral security descriptors generated by the Bayesian learning engine 122 may comprise, for example, developed and instantiated flows of logical expressions that are representative of malfeasance, such as the patterns expressed by malware, advanced persistent threat actors, or general malicious activity. Using the warehoused logical descriptors 124 and the scores derived from the Bayesian learning engine, thresholds of activities can be encapsulated and represented such that alerts are generated by alerting engine 114 when certain non-specific series of events are captured.

As one more particular example, the computational semantic parser 120 may parse incoming log data directly into its component elements, and then create variable bindings based on one or more combinatorial trees. This example assumes that the parsed incoming log data comprise a novel log entry. Any previously-seen trees will be stored and re-used for faster parsing. A logical result is generated, and the corresponding data structure is stored in the data warehouse of database 112. The event is catalogued by the Bayesian learning engine 122, and sequenced as learning data. Known alert trigger meanings, i.e., those events that are precursors to a possible alert given further conditions, will result in creation of a thread to watch for those conditions, with the thread decaying and ending after a specified time should follow-on events not appear.

The anomaly engine 114 mines the data warehouse in a parallel manner on a continual basis using various factors as the organizing principle (e.g., user, host, network connections, etc.), searching for high-risk pattern deviations as modeled by the behavioral security descriptors 126 generated by the Bayesian learning engine 122.

The computational semantics parser 120 and Bayesian learning engine 122 can be utilized to perform additional or alternative functions within STEM system 110. For example, these elements can be used to provide a natural-language interface for queries of the STEM database 112, thereby allowing database searches to be stated in the form of simple English questions.

Although shown in the present embodiment as being separate from the IT infrastructure 104, portions of the SOC 102 in other embodiments may be implemented at least in part within the IT infrastructure 104.

The SOC 102 or portions thereof may be implemented utilizing one or more processing devices. A given such processing device generally comprises at least one processor and an associated memory, and includes one or more functional modules for controlling certain features of the system 100.

The processor in a processing device of this type may comprise a microprocessor, a microcontroller, an application-specific integrated circuit (ASIC), a field-programmable gate array (FPGA) or other type of processing circuitry, as well as portions or combinations of such circuitry elements.

The memory may comprise random access memory (RAM), read-only memory (ROM) or other types of memory, in any combination. The memory and other memories disclosed herein may be viewed as examples of what are more generally referred to as "computer program products" storing executable computer program code.

In addition to a processor and a memory, a processing device will generally include a variety of other types of circuitry, such as network interface circuitry that allows the processing device to communicate with other processing devices over one or more networks. Such networks may include, for example, a global computer network such as the Internet, a wide area network (WAN), a local area network (LAN), a satellite network, a telephone or cable network, a cellular network, a wireless network such as WiFi or WiMAX, or various portions or combinations of these and other types of networks. The network interface circuitry may comprise one or more conventional transceivers.

It is to be appreciated that the particular set of elements shown in FIG. 1 for providing semantically-aware behavioral security analysis for the IT infrastructure 104 is presented by way of example, and in other embodiments additional or alternative elements may be used. Thus, another embodiment may include additional sets of processing devices or other types and configurations of IT infrastructure and associated SOC and SIEM components.

As mentioned previously, various elements of system 100 such as computers, servers, storage devices or their associated functional modules may be implemented at least in part in the form of software. Such software is stored and executed utilizing respective memory and processor elements of at least one processing device. The system 100 may include additional or alternative processing platforms, as well as numerous distinct processing platforms in any combination, with each such platform comprising one or more computers, servers, storage devices or other types of processing devices.

It was described above that the system 100 in the present embodiment implements a process for semantically-aware behavioral security analysis for the IT infrastructure 104. An example of such a process performed utilizing particular components of system 100 will be described in conjunction with FIG. 2, but it is to be appreciated that numerous other types of processes may be used in other embodiments.

Figure 2:
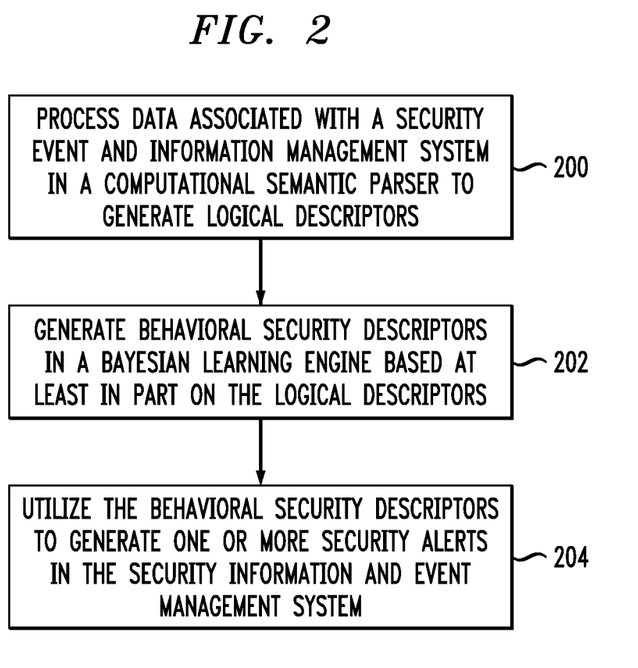
FIG. 2 is a flow diagram of a process for semantically-aware behavioral security analysis in the information processing system of FIG. 1.

FIG. 2 shows a set of operations performed by the SIEM 110 of the SOC 102. The process as shown includes steps 200, 202 and 204, which are assumed to be performed using the behavioral security analysis system 115, although in other embodiments one or more such steps may be implemented at least in part by other system elements.

In step 200, data associated with the SIEM system 110 is processed in the computational semantic parser 120 to generate a plurality of logical descriptors 124. The processed data may comprise, for example, incoming log data of the SIEM system 110. The processing in the computational sematic parser may involve, for example, syntactically decomposing a portion of the data into component elements, assigning lexical meanings to the component elements, assigning context denotation information to the component elements, and applying semantic recomposition to generate a given logical descriptor based on at least one combinatorial tree having nodes associated with respective ones of the component elements and a tree structure determined at least in part based on the assigned lexical meanings and context denotation information. Each of these processing operations of the computational semantic parser 120 will be described in greater detail below.

In step 202, the Bayesian learning engine 122 generates a plurality of behavioral security descriptors 126 based at least in part on at least a subset of the logical descriptors 124. This may involve, for example, assigning Bayesian risk scores to respective ones of the behavioral security descriptors based on one or more security threat models.

In step 204, the behavioral security descriptors 126 are utilized to generate one or more security alerts. For example, the anomaly alerting engine 114 may generate a given one of the security alerts upon detection of events having particular characteristics associated with one or more of the behavioral security descriptors 126.

The particular processing operations and other system functionality described in conjunction with the flow diagram of FIG. 2 are presented by way of illustrative example only, and should not be construed as limiting the scope of the invention in any way. Alternative embodiments can use other types of processing operations for semantically-aware behavioral security analysis of IT infrastructure. For example, the ordering of the process steps may be varied in other embodiments, or certain steps may be performed concurrently with one another rather than serially. Also, one or more of the process steps may be repeated periodically or on an as-needed basis responsive to particular events. The steps of the FIG. 2 process are assumed to be implemented in a processing platform comprising at least one processing device having a processor coupled to a memory.

It is to be appreciated that behavioral security analysis functionality such as that described in conjunction with the flow diagram of FIG. 2 can be implemented at least in part in the form of one or more software programs stored in memory and executed by a processor of a processing device such as a computer or server. As mentioned previously, a memory or other storage device having such program code embodied therein is an example of what is more generally referred to herein as a "computer program product."

The embodiments described in conjunction with FIGS. 1 and 2 can provide a number of significant advantages relative to conventional practice. For example, the behavioral security analysis system 115 of STEM 110 provides an automated layer of log parsing such that novel incoming messages can be used for downstream content functionality, such as reporting and correlation, without manual human intervention for classification and categorization. This also allows correlation, aggregation, and comparison in a flexible, generalized format, thus allowing the expression of malicious patterns as, for example, known-bad sequences of generalized logical semantic expressions, or deviations from a previously-assessed functional semantic baseline. The SIEM system 110 with behavioral security analysis system 115 improves the reaction times to potential threats to near-real time by providing general security knowledge rather than rigid, pre-defined patterns of malicious intent. These embodiments therefore provide a predictive SIEM platform having a greatly enhanced ability to detect security breaches and other security-related anomalies.

Figure 3:
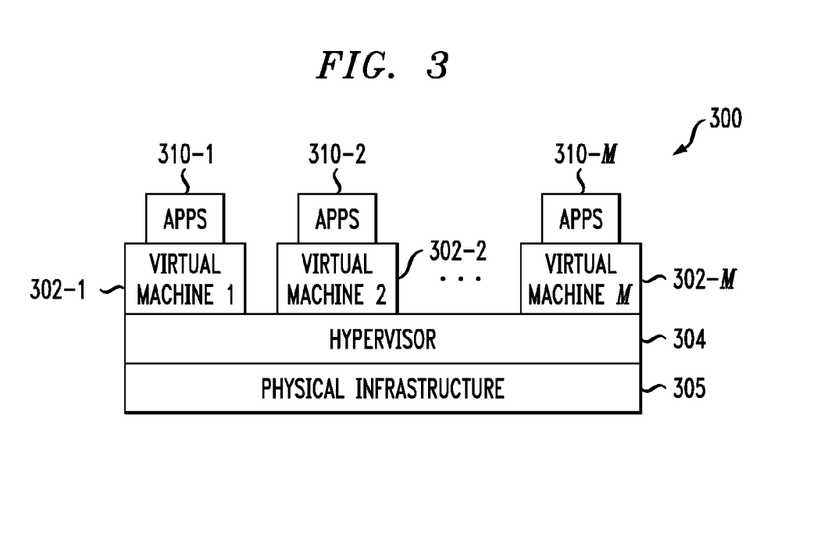
FIGS. 3 and 4 show examples of processing platforms that may be utilized to implement at least a portion of the FIG. 1 system.

Referring now to FIG. 3, portions of the information processing system 100 in this embodiment comprise cloud infrastructure 300. The cloud infrastructure 300 comprises virtual machines (VMs) 302-1, 302-2, . . . 302-M implemented using a hypervisor 304. The hypervisor 304 runs on physical infrastructure 305. The cloud infrastructure 300 further comprises sets of applications 310-1, 310-2, . . . 310-M running on respective ones of the virtual machines 302-1, 302-2, . . . 302-M under the control of the hypervisor 304. The cloud infrastructure 300 may be viewed as providing an example of what is more generally referred to herein as "virtual infrastructure." The cloud infrastructure 300 may encompass the entire system 100 or only portions of that system, such as the IT infrastructure 104.

Although only a single hypervisor 304 is shown in the embodiment of FIG. 3, the system 100 may of course include multiple hypervisors each providing a set of virtual machines using at least one underlying physical machine.

An example of a commercially available hypervisor platform that may be used to implement hypervisor 304 and possibly other portions of the IT infrastructure 104 of information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the IT infrastructure of system 100.

As indicated previously, the system 100 may be implemented using one or more processing platforms. One or more of the processing modules or other components of system 100 may therefore each run on a computer, server, storage device or other processing platform element. A given such element may be viewed as an example of what is more generally referred to herein as a "processing device." The cloud infrastructure 300 shown in FIG. 3 may represent at least a portion of one processing platform. Another example of such a processing platform is processing platform 400 shown in FIG. 4.

Figure 4:
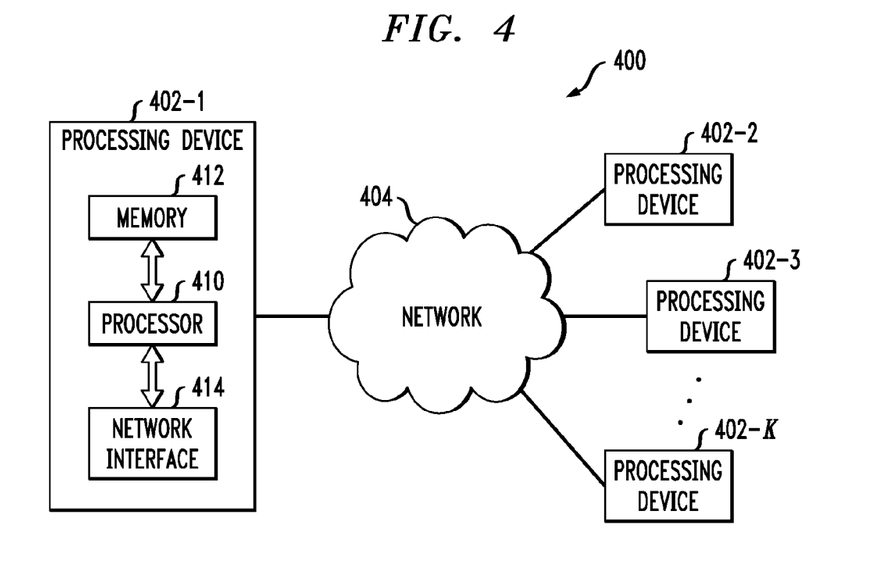

The processing platform 400 in this embodiment comprises a portion of the system 100 and includes a plurality of processing devices, denoted 402-1, 402-2, 402-3, . . . 402-K, which communicate with one another over a network 404. The network 404 may comprise any type of network, such as a WAN, a LAN, a satellite network, a telephone or cable network, or various portions or combinations of these and other types of networks.

The processing device 402-1 in the processing platform 400 comprises a processor 410 coupled to a memory 412. The processor 410 may comprise a microprocessor, a microcontroller, an ASIC, an FPGA or other type of processing circuitry, as well as portions or combinations of such circuitry elements, and the memory 412, which may be viewed as an example of a "computer program product" having executable computer program code embodied therein, may comprise RAM, ROM or other types of memory, in any combination.

Also included in the processing device 402-1 is network interface circuitry 414, which is used to interface the processing device with the network 404 and other system components, and may comprise conventional transceivers.

The other processing devices 402 of the processing platform 400 are assumed to be configured in a manner similar to that shown for processing device 402-1 in the figure.

Again, the particular processing platform 400 shown in the figure is presented by way of example only, and system 100 may include additional or alternative processing platforms, as well as numerous distinct processing platforms in any combination, with each such platform comprising one or more computers, servers, storage devices or other processing devices.

Multiple elements of information processing system 100 may be collectively implemented on a common processing platform of the type shown in FIG. 3 or 4, or each such element may be implemented on a separate processing platform.

The operation of the computational semantic parser 120 in the behavioral security analysis system 115 of the SIEM system 110 will now be described in greater detail.

Computational semantics as implemented in one or more illustrative embodiments herein generally provides a framework for modeling infinitely-combinatorial natural language that can be adapted for use in the parsing and categorization of novel system messages with little to no ongoing manual intervention. This is accomplished by assigning specific semantic "types" to syntactic objects recognized in the message stream, and then, possibly using lambda calculus as a combinatorial method, computing the relational values of these individual units of meaning such that a single logical value can be derived. Once computed, this logical value represents the meaning of a message as might be understood by a human interpreter, as well as an appropriate categorization and parsing into discrete variables. Furthermore, the resultant logical value can be assigned attributes such as intent, outcome, disposition, and other critical meaning-oriented values directly relevant to a security framework.

Since the semantic types represented in an event source message set are more constrained than the set used for natural language, this presents a tenable solution that can be fully modeled in a number of programming languages.

The fundamental steps in computational semantic processing are intended to model those of a human brain when encountering a novel data set, which may be in the form of one or more event source logs.

As noted above, the computational semantic parser 120 performs four steps, syntactic decomposition, lexical meaning assignment, assignment of denotation and semantic recomposition. These steps are denoted below as Step 1 through Step 4, respectively, and collectively comprise an exemplary combinatorial semantics algorithm. It is to be appreciated that in other embodiments, different sets of processing steps and algorithms may be used by the computational semantic parser 120.

Before describing the process implemented by computational semantic parser 120 in the present embodiment, there are several fundamental notions that will be covered regarding assumptions made in this methodology. Specifically, a discussion on the governing principals to be used is provided. As this methodology is intended to model comprehension, it includes an account that follows the same rules, such that the related concepts of recursion and type-governance are important.

Recursion is fundamental to our understanding of language. For a finite set of words (e.g., a lexicon) and a finite set of rules by which they can be combined, there are an infinite number of possible combinations that result in semantically valid sentences. The reason for this is that language, understood in a combinatorial framework, is recursive—that is, the output of the combinatorial rules governing lexical components can be used as input for further combination. For example, a complete sentence (such as "It is snowing.") can be used as input to a further construct creating a novel sentence (e.g. "I am saying that it is snowing."), ad infinitum (e.g. "She is thinking that I am saying that it is snowing."). In this case, using the output of prior combinatorial rules (specifically, those covering the combination of a nominative noun, copular verb, and direct object) can be used as input for the same combinatorial rule, this time using the entire original sentence as a direct object. By feeding the prior output into the same rule with novel nominative nouns and copular verbs, a new sentence with a new meaning is constructed. Because these recursive rules are a fundamental part of the manner in which humans understand language, we have the capability of instantly understanding any such new construction in a language with which we are familiar.

However, in order to understand a syntactic grammar as recursively implementing a given lexicon, an assumption needs to be made regarding how the grammar itself is split into types. By looking at individual syntactic units such as "France" or "run", we know that they carry the semantic types of proper noun and verb, respectively. Part of the reason that we know this is that we have an idea of how these particular words combine with other words to convey meaning, implying that this very combinatorial nature is in fact one of the principals governing the mechanisms of language. Therefore, it is one of the fundamental assertions of computational semantics is that all grammar is governed by categories, and can in fact be split into specific types that have unique recursive combinatorial rules assigned to them.

While the combinatorial types and associated rules developed by many semanticists for English grammar are useful for a basic understanding of the computational semantic construct, an assumption is being made that similar but ultimately different rules exist for the parsing of log data. Since events themselves constitute a fractional proportion of natural language, we can consider the set of working log files a constructed or artificial language, and develop types and rules that are particular to only this subset of meanings. This will both greatly constrain the work effort to implement this framework, and potentially isolate or limit the set of issues that are encountered in the course of said implementation.

Given the procedural steps of the exemplary combinatorial semantics algorithm of the present embodiment, as listed above and further explained below, it is also important to note that there is a fundamental relationship between syntactic information such as lexical units or sentence layout and semantic recomposition (i.e., the derivation of meaning). Specifically, it is assumed that we can, through the methods of syntactic decomposition and assignment of meaning from a finite number of well-understood categories, recompose a sentence such that we accurately compute its total meaning. An important component, then, is the appropriate computation and assignment of the categories of meaning themselves.

Step 1: Syntactic Decomposition

The first step in the computational semantic algorithm is a breakdown of the incoming dataset into atomic units, such that each is irreducible in any way that would ultimately recompose semantically. While one implication of this step is a split along standard sentential breaks—specifically, spaces and punctuation—it is important to understand cases wherein spaces do not necessarily themselves denote a syntactic unit, and which rules do apply to this baseline layer of parsing.

Cases in which the decomposition is not as simple as a split include those involving prepositions or other indicators that direct the usage of a given atomic component. For example, words such as 'to', 'from', 'by', 'of', etc, indicate a relationship, such as that of a direct object, and indirect object, or a subject. Since the ultimate goal is to recompose the message in a semantic tree, these words give clues as to the positioning within the tree of nearby objects, and the ultimate combinatorial value of that segment of a message. Other examples include possessives, contractions, and compound words.

As the message is decomposed, a data structure describing each atomic unit should be created. The data structure may contain, for example, position of a unit in a sentence, nearby words (i.e., those preceding and following it), and any indicators that seem to apply (such as prepositions). The data structures related to each word will be used as a baseline for defining the tree structure used in semantic recomposition.

Step 2: Lexical Meaning Assignment

Once the syntactic units have been identified and tagged with as much information as can be derived from the message structure, the next step is to appropriately identify these items from a lexicon of types, and assign the related meaning value. This value is ultimately the semantic quantity that will be used to combine these items and compute a final logical meaning for the overall message. A simple example of a lexicon is a basic hash table, containing words to match against and associated values (e.g., as described in the lambda calculus below) for use in semantic recomposition. While defining individual words is certainly a possibility, this approach fails at the level of recognizable types of information typically contained within event data, such as IP addresses, hostnames, ports, etc. As such, the lexicon in the present embodiment utilizes regular expressions as the matching operator, such that easily-described types can be categorized as such quickly without interfering with the overall goals of automated parsing. While this step of the process indeed relies on lower-order languages (such as regular expressions) to match against types, the matching is done at the level of atomic syntactic unit rather than the entirety of the message.

For the first pass of assignment, all semantic types are hypothetical. While a lexicon can provide a good basis from which the system can process (and ultimately also provides one of the foundations for a machine-learning approach, as described below), it is not the ultimate arbiter of semantic type. Instead, testing of the assigned hypotheses through semantic recomposition (Step 4) can prove or disprove the individual types assigned to syntactic units. This process can take several iterations of the overall algorithm, as the individual type hypotheses are tested and re-tested through combination. Furthermore, the assignment of denotation adds depth to the static lexical assignment, and often solves unresolved type mysteries. As such, this is the next step in the overall procedure.

Step 3: Denotation Assignment

In generalized semantics, denotation refers to the universe of discourse for a given statement. For example, in the real world, there are certain basic assumptions that can be made in using language in a non-fictional manner—the laws of physics, human understanding, or cultural codes all serve this purpose. As such, in the sentence "It is raining," there are various assumptions that the human understanding of language requires to understand the overall meaning. For example, if the speaker is in the same room, it is assumed that the sentence is denoted by the situation outside; specifically, that it is raining in the surrounding area. (Also denoted are the ideas that it is raining water, that the speaker is being truthful, and perhaps even some emotion or mood conveyed by the intonation in the method of delivery.) Similarly, when understanding log files, there are environmental and contextual attributes that may enrich the understanding of a given event source. For example, an individual researching an event on a firewall will understand a message differently, given standard network location and system function, than the same message on a client windows host system. Thus, these types of attributes should be modeled in an accurate account of semantic understanding.

Attributes to be modeled in the semantic reconstruction of log files include any environmental or overall system data that might provide needed context by adding lexical objects or, potentially, change the combinatorial types of individual lexical units assigned in Step 2 of the process. One example of such an attribute is a device class—once a device has been discovered by SIEM system 110, its type helps to refine the manner in which some meanings are assigned, as the typical function of a given device has a clear role in the understanding of its denotation. There may be various "global" attributes shared among all members of a given device class, or individual lexical items that diverge from the generalized lexicon used in Step 2. Additional attributes may be available from environmental sources, such as asset management databases and other linked context data, any of which may similarly change or add a lexical type. All such changes should be applied during this step, prior to semantic computation.

The above-noted enVision® SIEM product currently contains several items that could be considered valuable in the assignment of denotation. For example, systems that have been scanned via a vulnerability service or imported from an asset management database contain information about particular attributes that could be used in the denotation assignment step. Such a usage of the asset management database may be in the form of a static set of denotation markers stored in a separate static XML file or similar structure.

Step 4: Semantic Recomposition

The fourth step of the combinatorial semantics algorithm is the actual combination of collected meanings, and (if successful) the computation of a total meaning value. All of the data gathered to this point, including syntactic information, semantic meanings, and denoted context are taken into account in the combinatorial process.

The actual procedure for composition follows a specific formal logical system, which will be referred to as System S herein. The rules for combining individual constituents in the context of System S are fully explored herein, including those specific logical procedures (e.g., deductive rules or "moves") that are permissible in combinatorial derivations; however, a general description of the procedure follows.

First, a hypothetical tree structure is built from the bottom upwards in an attempt to model which items combine individually to pass computed output to the next-highest node as input. Parallelism of individual combinatorial operations at similar but exclusive tree levels is thus recommended to improve overall performance. To achieve the initial tree structure, adjoining semantic types are compared for initial combinatorial compatibility, and more likely matches are attempted as combinatorial pairs first. At this point, the actual combination procedure is run per the rules described herein. If the items combine as hypothesized, the result is a concrete logical statement that represents the log message and its constituents, which can then be evaluated for correspondence with event category attributes such as theme, type, and outcome. Additionally, success entails the acceptance of the individual meaning assignments, each of which (with syntactic and denotation information) corresponds to a particular event variable. The original syntactic unit is thus assigned to an event variable, and made available for reporting and alerting purposes.

Should the initial hypothesized tree fail, additional tree permutations (i.e. reiterations of Step 4) are attempted until a successful combination is achieved. If a successful combination is not possible given the lexical meanings assigned, the overall process is reverted to Step 2, and alternative lexical assignments are attempted. This process repeats until a successful run of the overall algorithm is achieved for a given log message. Since this process is an iterative modeling of a proposed human understanding process, it may be possible to misapply lexical assignments and gain a successful but incorrect result, as is the case in manual processing. As such, it is intended that the output this overall process be used as input for an expert-system type learning algorithm that generalizes over types and learns from either statistical occurrences or human feedback.

Computational Semantic Inputs and Outputs

The computational sematic parser 120 in a given embodiment has the following inputs and outputs.

Inputs:

1. Log data, separated per standard syslog conventions.

2. Generated atomic syntactic units representing log data components, with metadata about position and attributes.

3. A lexicon of syntactic types, including regular expression matching and/or explicit listing corresponding to computational semantic constructs defined in the lambda calculus.

4. Denotation information, including any contextual modifications to standard lexicon entries, addition of additional lexicon entries to be included as attributes, or enriching data attributes from external sources.

Outputs:

1. A semantic tree structure representing the combined syntactic units.

2. A defined logical representation of the semantic value, to be used in event categorization.

3. A set of semantic values derived from proven type applications, to be used in the application and population of variables.

Note that the only externally-defined items in this procedure are the log data itself and the lexicon of generalized semantic types and matching mechanisms. The lexicon itself is the only item that needs to be maintained and updated over time to account for new usages and other variations. All other items are generated as components of the overall process or derived from other sources in the STEM knowledge base.

In other embodiments, the parser 120 may utilize only a subset of the inputs and outputs listed above, or other types of inputs and outputs.

The Lambda Calculus

The Lambda Calculus is the combinatorial framework used in illustrative embodiments of the invention to model the individual semantic computations occurring between pairs of assigned meanings, although other combinatorial frameworks may be used in other embodiments. Combined with the rule set of combinatorial logic, the Lambda Calculus provides the foundation of Step 4 of the overall combinatorial semantics algorithm. The objects contained in the lexicon are described in the Lambda Calculus, as lambda abstraction will be the language used to define semantic types in these embodiments. While any number of other abstractions could be used to model the combinatorial operations (e.g., set theory, indirect semantic modeling, type theory, etc.), the Lambda Calculus is advantageous in view of its ability to model inputs and outputs, and to accommodate recursive frameworks, as will be shown in more detail below.

The basic abstraction rule that will be utilized is referred to herein as lambda-conversion. Expressed as an axiom, it reads as follows:

$$\forall v \{[\lambda v \Phi] \langle v \langle \langle \Phi \}$$

The above axiom reads that for all variables v, λv for formula Φ can be combined with variable v (dereferenced as a constant) if and only if Φ is true. For the usage being described here, this axiom can be expressed as a bi-directional inference rule in standard logic. The lambda-conversion rule is then as follows:

$$[\lambda v \Phi] \langle c \langle //\Phi[c/v]$$

This reads that for any variable v and formula Φ, constant c can be substituted for variable v, and vice versa. The specific notation used in this inference rule is important, as it will represent the combinatorial operation in all instances going forward. It is also important to note that this rule is infinitely combinatorial, which is to say that it works for any number of variables and constants. Specifically:

$$[\lambda v1 \ldots \lambda vk \Phi] \langle c1, \ldots, ck \langle //\Phi[c1/v1 \ldots ck/vk],$$

where k is a positive integer. Note that in the case of multiple-place predicates, constants are substituted for variables on a 1:1 basis, from left to right. To give a pragmatic example of lambda-conversion usage and the interpretation of the notation presented, consider the natural-language one-place predicate 'exists'. This can be combined with a subject and used in a sentence, such as "Kay exists", and can be represented in sentential logic as the expression 'Ek'. By application of the lambda-conversion rule to this complete sentence, the following can be obtained:

$$[\lambda x(Ex)]\langle k \rangle$$

The resulting lambda-formula above reads as "a variable x such that x exists" or "lambda x such that x exists". Note that in the combinatorial rule, the abstracted function is placed in square brackets, while the constant to be combined is enclosed in angle brackets. Reverse application of the rule in this case yields, simply, 'Ek', as this rule is bidirectional. To extrapolate this usage over a multiple-place predicate, consider the two-place predicate 'respects'. Generally, this predicate requires a subject and direct object to be considered a complete sentence, such as 'Jay respects Kay', wherein Jay is the subject and Kay is the direct object. Expressed logically, this sentence reads 'Rjk', where T is the subject and 'lc' is the direct object. After application of lambda conversion, the following is obtained:

$$[\lambda x \lambda y(Rxy)]\langle j, k \rangle$$

Note that the expression combines left-to-right, meaning that the first item in the angle brackets combines with the first lambda-functor, and so forth. If the variables included in the lambda expression were reversed, the following would occur:

$$[\lambda y \lambda x(Rxy)]\langle j, k \rangle //Rkj$$

Which reads "Kay respects Jay", the inverse of the original sentence. The same result would be obtained by switching the positions of the constants (j,k to k,j) in the original expression.

While this is a functionally and logically complete description of the lambda-conversion rule, its application possibilities are far broader than the preceding examples imply. Lambda-conversion can accept predicates themselves as valid types, as well as other lambda expressions. These items become important in the function-application steps to be performed in Step 4 of the combinatorial semantic algorithm.

In order to account for all types of expressions contained within a given set of events, the usage of lambda conversion should extend to the combination of predicates and other lambda expressions. While the basic conversion rule does nominally explain how this would work, it is worth exploring these moves for the sake of clarity. The use of the word 'predicate' in this sense refers to the sentential logic usage; that is, a predicate is a verb phrase or other action unit that takes noun phrases or other objects as input. The simple translation of the lambda-conversion rule to account for this is as follows:

$$[\lambda V \Phi] \langle P \langle //\Phi[P/V]$$

In other words, lambda abstraction over a predicate variable V entails acceptance of predicate P as a constant. In general usage, again consider the sentence 'Jay respects Kay'. If we were to perform lambda conversion on the predicate, the following would be the result:

$$\lambda P(Pjk)$$

At this point, the abstracted lambda expression accepts only predicate types as input:

$$[\lambda P(Pjk)]\langle Respects \rangle //Rjk$$

In this usage, capital letters in a lambda expression will be used to denote predicate types.

At this point, the combination of individual lambda-converted objects becomes a distinct probability. At various levels of a semantic tree model, particularly in the early stages of combinatorial processing, incomplete expressions with open (i.e., unbound) lambda variables will be the norm. As such, lambda expressions should combine appropriately to proceed to the next node in the tree hierarchy.

As an example, consider two lambda-converted objects that must combine using the same lambda-conversion rule in order to be integrated into a sentence. Using the same example ('Jay respects Kay') used as a sentence fragment rather than a complete sentence, the following could be posited:

[λPλQ(P&Q)]<λxλyRxy>//λQλxλy(Rxy&Q)
[λQλxλy(Rxy&Q)]<j>//λQλy(Rjy&Q)
[λQλy(Rjy&Q)]<k>//λQ(Rjk&Q)
... etc In essence, the operation must determine the type of the input in order to properly accept it as valid and perform the combinatorial process. Predicates can only combine with predicate lambda-types (e.g. λP), and noun phrases with np types. Note that after all lambda-conversion operations above, unbound variables remain, and the left-to-right variable binding rule remains, albeit selectively by type.

Figure 5A:
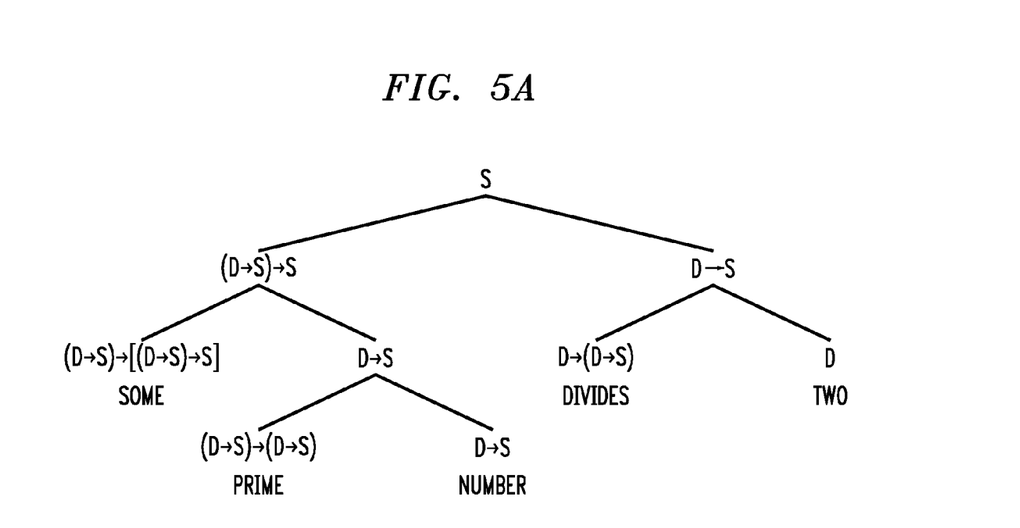
FIGS. 5A and 5B show examples of combinatorial trees that may be generated in a computational semantic parser of the FIG. 1 system.
Figure 5B:
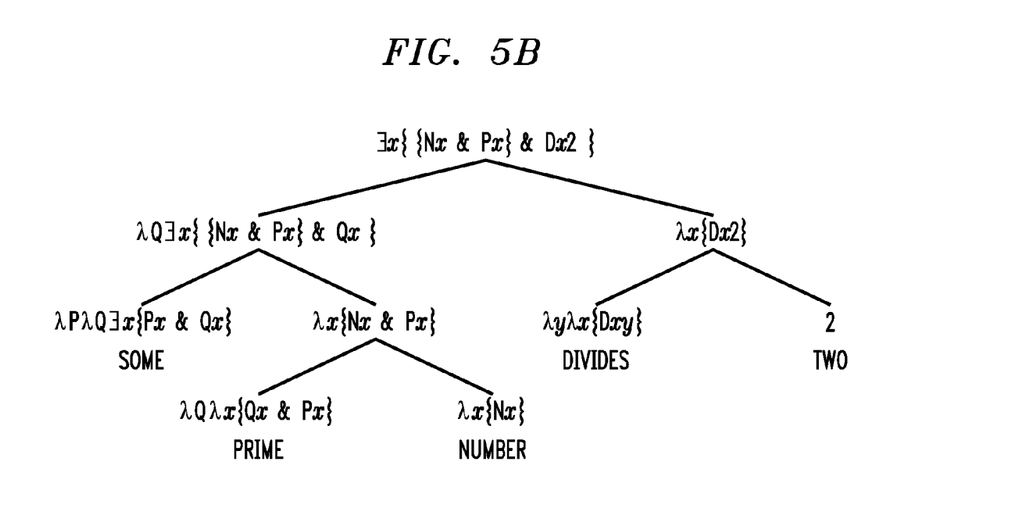

Examples of combinatorial trees generated in accordance with the above-described framework are illustrated in FIGS. 5A and 5B. Note that the tree as shown in FIG. 5A is a type-theoretic representation, and the tree as shown in FIG. 5B is a Lambda Calculus implementation and translation into meaning. The particular sentence being analyzed in these examples is "Some prime number divides two."

As described previously in conjunction with FIG. 1, the storage and evaluation of logical objects or other logical descriptors 124 within the SIEM database 112 is fundamental to discovering novel patterns of normal usage and anomalies, using the Bayesian learning engine 122.

In order to capture the fullness of data being expressed, a number of individual items may be stored for each log entry in the present embodiment. These may include:
1. The original message
2. The message parsed into variable and static data
3. The event category
4. The logical representation of that message
5. A pointer to the semantic tree used to parse the line (for heuristic usage in further parsing)
6. The data structure used in the computational semantic parsing Use of the items listed above allows significant analytic capability. While storing and indexing in a data warehouse by, for example, variable data will allow for fast searching and report composition, storing the logical representation as an evaluable object is also important. By doing so, logical deductions can be run to prove or disprove adherence to or divergence of a pattern. By setting the suspect logic as premises and positing a conclusion relevant to the goal being sought (e.g. "User X is inappropriately escalating privilege" or "System Y is exhibiting malware behavior"), a standard deduction in second-order predicate logic can prove or disprove the assertion. Combining this technique with a typical "triggered" alert situation that seeks a single precursor event to a possible set of misbehaviors allows for an extremely rich description language for alerts, for these can then be described as series of logical statements rather than explicitly encoded events. An advantage of an arrangement of this type is that novel messages matching the meanings of these events will also trigger an alert with no further human interaction.

In addition, the application of the learning engine 122 allows for a time-bound analysis of the "story" of the network unfolding over time. Since the events on the network are expressed as statements, a separate process can mine the database 112 for patterns of logic "like" previously-seen malfeasance, and assign a Bayesian risk score to each. If a system administrator set a particular risk score threshold over which an alert is generated, the possibility of discovering novel attacks, advanced persistent threats, zero-day attacks, and other elusive activities is increased significantly.

As indicated previously, functionality such as that described in conjunction with the diagrams of FIGS. 1 through 5 can be implemented at least in part in the form of one or more software programs stored in memory and executed by a processor of a processing device such as a computer or server. A memory having such program code embodied therein is an example of what is more generally referred to herein as a "computer program product."

It should again be emphasized that the above-described embodiments of the invention are presented for purposes of illustration only. Many variations may be made in the particular arrangements shown. For example, although described in the context of particular system and device configurations, the techniques are applicable to a wide variety of other types of information processing systems, IT infrastructure and processing device configurations, behavioral security analysis systems and associated processes, combinatorial semantics algorithms, and parsing and learning techniques. In addition, any simplifying assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   at least one processing device comprising a processor coupled to a memory and implementing a behavioral security analysis system, the behavioral security analysis system comprising:
     a computational semantic parser configured to process data associated with a security information and event management system to generate a plurality of logical descriptors, the data comprising log data of the security information and event management system; and
     a learning engine coupled to the computational semantic parser and configured to generate a plurality of behavioral security descriptors based at least in part on at least a subset of the logical descriptors;
   wherein the behavioral security descriptors are made accessible to an alerting engine of the security information and event management system and utilized to generate one or more security alerts; and
   wherein the computational semantic parser comprises:
     a syntactic decomposition module configured to decompose at least a portion of the log data into component elements comprising respective atomic syntactic units;
     a lexical meaning assignment module configured to assign lexical meanings to the component elements utilizing metadata associated with the component elements and a lexicon of syntactic types, the metadata comprising position information and attributes associated with the atomic syntactic units;
     a denotation assignment module configured to assign context denotation information to the component elements; and a semantic recomposition module configured to generate a given logical descriptor based on at least one combinatorial tree having nodes associated with respective ones of the component elements and a tree structure determined using the assigned lexical meanings and context denotation information.

2. The apparatus of claim 1 wherein the behavioral security analysis system is implemented at least in part within the security information and event management system.

3. The apparatus of claim 1 wherein the learning engine comprises a Bayesian learning engine.

4. The apparatus of 3 wherein the Bayesian learning engine is configured to assign Bayesian risk scores to respective ones of the behavioral security descriptors based on one or more security threat models.

5. The apparatus of claim 1 wherein the alerting engine is configured to generate a given one of the security alerts upon detection of an event having particular characteristics associated with one or more of the behavioral security descriptors.

6. The apparatus of claim 1 further comprising a database for storing at least a portion of the logical descriptors and the behavioral security descriptors.

7. The apparatus of claim 1 wherein the lexicon of syntactic types comprises one or more explicit listings corresponding to computational semantic constructs defined in a lambda calculus.

8. The apparatus of claim 1 wherein the lexicon of syntactic types comprises a plurality of entries and the denotation information comprises at least one of:
contextual modifications to at least one entry in the lexicon;
at least one additional entry for the lexicon; and
enriching attributes for at least one entry in the lexicon from one or more external sources.

9. The apparatus of claim 1 wherein:
a given one of the logical descriptors comprises a given logical value representing the meaning of a message;
the given logical value is computed based at least in part on a combination of:
individual units of lexical meaning associated with at least two atomic syntactic units; and
relational values of the individual units of lexical meaning associated with said at least two atomic syntactic units; and
the given logical value is assigned one or more attributes associated with the security information and even management system, the one or more attributes including at least one of intent, outcome and disposition.

10. A method comprising the steps of:
processing data associated with a security information and event management system in a computational semantic parser to generate a plurality of logical descriptors, the data comprising log data of the security information and event management system;
generating a plurality of behavioral security descriptors based at least in part on at least a subset of the logical descriptors; and
utilizing the behavioral security descriptors to generate one or more security alerts;
wherein the processing step comprises:
syntactically decomposing at least a portion of the log data into component elements comprising respective atomic syntactic units;
assigning lexical meanings to the component elements utilizing metadata associated with the component elements and a lexicon of syntactic types the metadata comprising position information and attributes associated with the atomic syntactic units;
assigning context denotation information to the component elements; and
applying semantic recomposition to generate a given logical descriptor based on at least one combinatorial tree having nodes associated with respective Ones of the component elements and a tree structure determined at least in part using the assigned lexical meanings and context denotation information.

11. The method of claim 10 wherein the processing, generating and utilizing steps are performed by at least one processing device of a processing platform.

12. The method of claim 10 wherein the generating step comprises assigning Bayesian risk scores to respective ones of the behavioral security descriptors based on one or more security threat models.

13. The method of claim 10 wherein the utilizing step comprises generating a given one of the security alerts upon detection of an event having particular characteristics associated with one or more of the behavioral security descriptors.

14. The method of claim 10 further comprising the step of storing at least a portion of the logical descriptors and the behavioral security descriptors in a database.

15. A computer program product comprising a non-transitory processor-readable storage medium having encoded therein executable code of one or more software programs, wherein the one or more software programs when executed by at least one processing device cause the at least one processing device:
to process data associated with a security information and event management system in a computational semantic parser to generate a plurality of logical descriptors, the data comprising log data of the security information and event management system;
to generate a plurality of behavioral security descriptors based at least in part on at least a subset of the logical descriptors; and
to utilize the behavioral security descriptors to generate one or more security alerts;
wherein processing data associated with the security information and management system comprises:
syntactically decomposing at least a portion of the log data into component elements comprising respective atomic syntactic units;
assigning lexical meanings to the component elements utilizing metadata associated with the component elements and a lexicon of syntactic types, the metadata comprising position information and attributes associated with the atomic syntactic units;
assigning context denotation information to the component elements; and
applying semantic recomposition to generate a given logical descriptor based on at least one combinatorial tree having nodes associated with respective ones of the component elements and a tree structure determined at least in part using the assigned lexical meanings and context denotation information.

16. An information processing system comprising:
information technology infrastructure;
a security information and event management system comprising an alerting engine for generating security alerts relating to at least a portion of the information technology infrastructure; and
a behavioral security analysis system comprising:
a computational semantic parser configured to process data associated with the security information and event management system to generate a plurality of logical descriptors the data comprising log data of the security information and event management system; and a learning engine coupled to the computational semantic parser and configured to generate a plurality of behavioral security descriptors based at least in part on at least a subset of the logical descriptors;

wherein the behavioral security descriptors are utilized by the alerting engine of the security information and event management system to generate one or more of the security alerts;

wherein the behavioral security analysis system is implemented by at least one processing device comprising a processor coupled to a memory; and wherein the computational semantic parser comprises:

a syntactic decomposition module configured to decompose at least a portion of the log data into component elements comprising respective atomic syntactic units;

a lexical meaning assignment module configured to assign lexical meanings to the component elements utilizing metadata associated with the component elements and a lexicon of syntactic types, the metadata comprising position information and attributes associated with the atomic syntactic units;

a denotation assignment module configured to assign context denotation information to the component elements; and a semantic recomposition module configured to generate a given logical descriptor based on at least one combinatorial tree having nodes associated with respective ones of the component elements and a tree structure determined using the assigned lexical meanings and context denotation information.

17. The information processing system of claim 16 wherein the security information and event management system is at least partially implemented within the information technology infrastructure.

18. The information processing system of claim 16 further comprising a security operations center associated with the information technology infrastructure, wherein the security information and event management system is implemented at least in part within the security operations center.

19. The information processing system of claim 16 further comprising a database for storing at least a portion of the logical descriptors and the behavioral security descriptors.

20. The information processing system of claim 16 wherein the information technology infrastructure comprises at least one processing platform having a plurality of processing devices with each such processing device of the processing platform comprising a processor coupled to a memory.

\* \* \* \* \*

UNITED STATES PATENT AND TRADEMARK OFFICE
CERTIFICATE OF CORRECTION

| | | |
|---|---|---|
| PATENT NO. | : 9,064,210 B1 | Page 1 of 2 |
| APPLICATION NO. | : 13/436884 | |
| DATED | : June 23, 2015 | |
| INVENTOR(S) | : Catherine V. Hart | |

It is certified that error appears in the above-identified patent and that said Letters Patent is hereby corrected as shown below:

In the specification:

In the field:

Column 1, line 10, please change "(STEM)" to --(SIEM)--

In the background:

Column 1, line 16, please change "STEM" to --SIEM--

Column 1, line 37, please change "STEM" to --SIEM--

Column 1, line 41, please change "STEM" to --SIEM--

Column 1, line 54, please change "STEM" to --SIEM--

In the detailed description:

Column 4, line 7, please change "STEM" to --SIEM--

Column 4, line 20, please change "STEM" to --SIEM--

Column 4, line 32, please change "STEM" to --SIEM--

Column 5, line 51, please change "STEM" to --SIEM--

Column 5, line 53, please change "STEM" to --SIEM--

Column 7, line 43, please change "STEM" to --SIEM--

Column 12, line 32, please change "ofSystem" to --of System--

Column 13, line 33, please change "STEM" to --SIEM--

Signed and Sealed this
Tenth Day of November, 2015

Michelle K. Lee
*Director of the United States Patent and Trademark Office*

CERTIFICATE OF CORRECTION (continued)
U.S. Pat. No. 9,064,210 B1

In the detailed description:

Column 13, line 57, please change "< v < <" to --< v > ↔--

Column 13, line 64, please change "< c<" to --< c >--

Column 14, line 5, please change ",ck <" to --,ck >--

Column 14, line 28, please change "T" to --'j'--

Column 14, line 28, please change "'lc'" to --'k'--

Column 14, line 58, please change "< P <" to --< P >--

Column 15, line 49, please start a new paragraph before the term "Use"

In the claims:

Column 18, line 5, please change "Ones" to --ones--

Column 17, line 65, please change "types the" to --types, the--

Column 19, line 1, please change "descriptors the" to --descriptors, the--